T. N. BERLIN.
Medicated Pessaries.

No. 208,883.  Patented Oct. 15, 1878.

WITNESSES
H. Aubrey Toulmin
J. J. McCarthy

INVENTOR
Trevanion N. Berlin
BY Alexander † Mason
ATTORNEYS

UNITED STATES PATENT OFFICE.

TREVANION N. BERLIN, OF FARMINGTON, MINNESOTA.

IMPROVEMENT IN MEDICATED PESSARIES.

Specification forming part of Letters Patent No. 208,883, dated October 15, 1878; application filed July 25, 1878.

*To all whom it may concern:*

Be it known that I, TREVANION N. BERLIN, of Farmington, in the county of Dakota, and in the State of Minnesota, have invented certain new and useful Improvements in Pessaries; and do hereby declare that the following is a full, clear, and exact description thereof, reference being had to the accompanying drawings, and to the letters of reference marked thereon, making a part of this specification.

The nature of my invention consists in a pessary composed of materials that will partially dissolve, for the cure of prolapsus uteri, leucorrhea, and all the forms of female weakness of the reproductive organs, as will be hereinafter more fully set forth.

In order to enable others skilled in the art to which my invention appertains to make and use the same, I will now proceed to describe its construction and operation, referring to the annexed drawings, in which—

Figure 1:
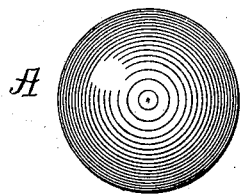
Figure 2:
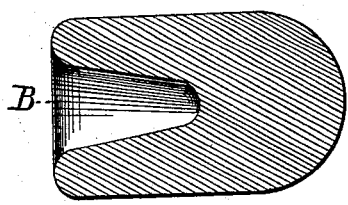

Figure 1 shows one form in which my dissolving uterine supporter may be put up. Fig. 2 shows another form of the same.

My pessary is composed of the following ingredients, viz., ozokerit, three hundred and ninety grains; powdered bark of slippery elm, three hundred and ninety grains; powdered leaves of witch-hazel, one hundred and twenty grains; bromo-chloralum, two drams.

The bromo-chloralum used by me is a liquid prepared by Tilden & Co., of New York city, and is a mercantile preparation sold by druggists throughout the United States.

These ingredients are mixed by the aid of heat or in any other suitable manner that will cause them to adhere together; and they are molded or otherwise formed in the shape of balls, as shown at A, or in cup form, as shown at B, so as to be adapted to the neck and mouth of the uterus; or they may be made in any shape or in any form to be adapted to parts within the vagina, as they may be found in practice.

In some cases, where ozokerit cannot be obtained, I may in lieu thereof use spermaceti, though this is not an exact equivalent of the same.

The dissolving pessary, being thus made into a solid body of medicinal qualities, is to be introduced into the vagina of the female in such a manner as to allow the uterus to rest upon the ball A or in the cup-shaped supporter B, which support remains for a long and indefinite time, only gradually dissolving and growing smaller at the point of contact with the mucous membrane, while the body of the supporter holds its shape intact.

The effect of this pessary is to furnish the patient with a mechanical support to retain the uterus in its normal position, and at the same to act as a curative agent medicinally, for both the uterus and the weakened walls of the vagina.

Having thus fully described my invention, what I claim as new, and desire to secure by Letters Patent, is—

The compound herein described, consisting of ozokerit, slippery elm, witch-hazel, and bromo-chloralum, for the purposes herein set forth.

In testimony that I claim the foregoing I have hereunto set my hand this 10th day of July, 1878.

TREVANION N. BERLIN.

Witnesses:
  ROWELL JUDSON,
  Z. P. FLUKE.